United States Patent
Lockhart et al.

(10) Patent No.: US 10,805,161 B2
(45) Date of Patent: Oct. 13, 2020

(54) RAPID CONFIGURATION PROPAGATION IN A DISTRIBUTED MULTI-TENANT PLATFORM

(71) Applicant: Verizon Digital Media Services Inc., Dulles, VA (US)

(72) Inventors: Daniel Lockhart, Los Angeles, CA (US); Derek Shiell, Los Angeles, CA (US); Harkeerat Bedi, Los Angeles, CA (US); Paulo Tioseco, Los Angeles, CA (US); William Rosecrans, Los Angeles, CA (US); David Andrews, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 242 days.

(21) Appl. No.: 15/703,478

(22) Filed: Sep. 13, 2017

(65) Prior Publication Data
US 2019/0081862 A1   Mar. 14, 2019

(51) Int. Cl.
*H04L 12/24* (2006.01)
*G06F 16/27* (2019.01)

(52) U.S. Cl.
CPC .......... *H04L 41/0889* (2013.01); *G06F 16/27* (2019.01); *H04L 41/082* (2013.01);
(Continued)

(58) Field of Classification Search
CPC ............. H04L 41/0889; H04L 41/0876; H04L 41/084; H04L 41/0873; H04L 41/082; G06F 16/27
See application file for complete search history.

(56) References Cited

U.S. PATENT DOCUMENTS

| 5,481,701 A * | 1/1996 | Chambers, IV .... G06F 12/0802 711/111 |
| 8,200,906 B2 * | 6/2012 | Twiss .................. H04L 12/1886 709/217 |

(Continued)

OTHER PUBLICATIONS

Oracle, "Zip File System Provider", https://web.archive.org/web/20120309032351/https://docs.oracle.com/javase/7/docs/technotes/guides/io/fsp/zipfilesystemprovider.html, Published on Mar. 9, 2012. (Year: 2012).*

*Primary Examiner* — Nam T Tran
(74) *Attorney, Agent, or Firm* — Ansari Katiraei LLP; Arman Katiraei; Sadiq Ansari

(57) ABSTRACT

Disclosed are different implementations for rapid configuration propagation across multiple servers of a distributed platform. One implementation is a push based distribution of update segments that are generated from a onetime differential analysis of an updated particular configuration relative to a previous instance of the particular configuration. Sequence numbers attached to the updated segments identify is a server's copy of a configuration is up-to-date and can receive a new updated segment or if missing intervening segments are to be retrieved from peers and applied prior to applying the new updated segment. Another implementation is a pull based distribution of compressed images of the configurations. A complete set of configurations are distributed as a compressed file system that is loaded into server memory. Individual configurations are read out of the file system and loaded into memory when implicated by client requests.

16 Claims, 8 Drawing Sheets

(52) U.S. Cl.
CPC ........ *H04L 41/084* (2013.01); *H04L 41/0816* (2013.01); *H04L 41/0853* (2013.01); *H04L 41/0856* (2013.01); *H04L 41/0866* (2013.01)

(56) References Cited

U.S. PATENT DOCUMENTS

| | | | |
|---|---|---|---|
| 8,341,283 B2* | 12/2012 | Argawal | H04L 67/104 709/231 |
| 9,088,491 B2* | 7/2015 | Vaidya | H04L 41/0846 |
| 2011/0307444 A1* | 12/2011 | Cox | G06F 16/273 707/625 |

* cited by examiner

RAPID CONFIGURATION PROPAGATION IN A DISTRIBUTED MULTI-TENANT PLATFORM

BACKGROUND ART

A distributed platform deploys servers in different physical locations. The distributed platform operates these servers to provide a common set of content or services from the different physical locations. The servers can provide the content or services for or on behalf of different customers. A distributed platform that distributes content or services of two or more different customers is referred to as a distributed multi-tenant platform. Content delivery networks (CDNs), cloud service providers, and hosting platforms are examples of some such distributed multi-tenant platforms. The term distributed platform is interchangeably used hereafter to refer to a distributed single-tenant platform or a distributed multi-tenant platform.

A common set of configurations are deployed to the distributed platform servers in order to define the control logic and operations with which the servers provide the common set of content or services from the different physical locations. The configurations can further set or change resources, behavior, messaging, and security of a server as some examples. More specifically, the configurations can set or change the caching policies, purging policies, access restrictions, quality of service, firewall settings, other security protections, and other operational parameters of a server.

Some distributed multi-tenant platforms allow customers to define their own custom configurations. The servers dynamically reconfigure with the control logic and operations of different customer configurations when content or services of customers defining those configurations are requested from or otherwise implicated at the servers.

A technical challenge is the updating of the configurations across the servers of the distributed platform. In other words, the challenge is to ensure that the latest set of configurations are timely propagated to each server of the distributed platform and that all servers operate according to a most recent updated copy of a particular configuration within a brief amount of time after the particular configuration is updated. This technical challenge is exacerbated as the number of configurations to propagate increases, the frequency with which the configurations are updated increases, and the distributed platform deploys more servers or support more customers. For example, when the distributed platform deploys 100 servers and has 100 customers that each define a custom customer configuration, the distributed platform distributes 10,000 total configurations in sending the 100 customer configurations to each of the 100 servers.

The distribution of large numbers of configurations introduces significant overhead within the distributed platform, thereby depleting resources otherwise used for providing the common set of content or services from the distributed platform servers. More specifically, distribution of large numbers of configurations consumes server bandwidth, processing resources, and memory or storage resources.

Prior art FIG. 1 illustrates a configuration distribution architecture for a distributed platform. The architecture involves a master repository 110, different repository mirrors 120, and various content or service providing servers 130 of the distributed platform.

The master repository 110 receives all customer configurations 140 and updates to the customer configurations 140. The master repository 110 periodically propagates the updated customer configurations 140 to the repository mirrors 120.

Each repository mirror 120 serves as a configuration distribution point for servers 130 operating in the same region as the repository mirror 120. To avoid overloading the repository mirror 120 of a given region, the servers 130 of that given region pull the updated configurations 140 from the repository mirror 120 in a staggered manner. In other words, each server 130 is allotted a time slot with which to request and retrieve configurations 140 from the repository mirror 120.

To reduce the overhead on the servers !30, the repository mirrors 120 do not provide entire customer configurations 140, but the differences 150 between customer configurations 140 on the servers 130 and those stored by the repository mirrors 120. Thus, if a server 130 requests updates to a particular configuration, and there have been no updates to the particular configuration, the repository mirror 120 avoids unnecessarily sending the same configuration to the server 130. Similarly, if a minor update has been made to the particular configuration, the repository mirror 120 sends the updated portion instead of the entire particular configuration, thereby saving bandwidth.

The architecture and distribution model of FIG. 1 does however introduce significant overhead on the repository mirrors 120. The overhead is the result of the repository mirrors 120 computing and identifying the differences between configurations on each server 130 and those stored to the repository mirror 120. This overhead reduces the speed with which configurations and updates are propagated from the repository mirrors 120 to the servers 130. Further configuration propagation delay results from the staggered manner with which the servers 130 pull configurations or updates from the repository mirrors 120. For instance, a particular server may request updates from a particular repository mirror. Immediately after updating the particular server, the particular repository mirror receives a set of configuration updates from the master repository. Those updates will not propagate to the particular server until the next allotted time at which the particular server pulls configurations from the particular repository mirror.

With such an architecture, there is no means by which to guarantee that the servers operate according to the same set of configurations. At any given time, the staggered pulling of configurations leaves one set of servers to operate with updated configurations and another set of servers to operate with older configurations.

A further issue with the staggered propagation of the configurations is the total time required to deploy updates or configurations to all servers of the distributed platform. Depending on the number of servers and the number of customer configurations, a full deployment of one round of configurations or updates may take several hours to complete. A customer that updates a particular configuration will be unsure which of the distributed platform servers have received and applied that update until a full propagation cycle is complete.

There is therefore a need for improved configuration propagation in a distributed platform. More specifically, there is a need for faster updating of configurations across servers of a distributed platform. There is also a need to reduce the overhead associated with configuration propagation without degrading propagation speed or the ability of the servers to perform other functions.

BRIEF DESCRIPTION OF THE DRAWINGS

A preferred embodiment for rapid configuration propagation in a distributed multi-tenant platform will now be described, by way of example only, with reference to the accompanying drawings in which.

DETAILED DESCRIPTION

I. Overview

The disclosed embodiments perform rapid configuration propagation in a distributed platform or a distributed multi-tenant platform. The distributed platform operates different sets of one or more servers that distribute content or performs other services over a digital network according to a common set of configurations. In a distributed multi-tenant platform, the sets of servers distribute content over the digital network or perform other services for various customers of the platform with the distribution of content and performance of services for a particular customer being customized according to a customer configuration defined by the particular customer. The configurations are files defining different sets of server configuration parameters. The rapid configuration propagation of some embodiments distributes the configurations across the different sets of servers with minimal delay and with minimal overhead.

Some embodiments perform the rapid configuration propagation via a push based distribution of update segments that are generated from a onetime differential analysis of an updated particular configuration relative to a previous instance of the particular configuration. Some embodiments perform the rapid configuration propagation via a push based distribution of compressed images of the configurations.

These embodiments significantly reduce delay and overhead for propagating configurations to the distributed platform servers relative to the prior art and other propagation systems and methods currently available. Computational overhead is reduced as a result of eliminating the separate computation and identification of update segments from a particular configuration for each server based on the previous instance of the particular configuration retained by each server. Bandwidth and messaging overhead is also reduced as a result of eliminating the extraneous messaging produced when the servers initiate the request and retrieval of the update segments or configuration. The embodiments reduce propagation delay and align configuration versioning across the servers of the distributed platform by eliminating the staggered requesting and retrieving of update segments or configurations by the servers, and instead pushing the update segments or updated configurations to the platforms servers at the same time.

II. Distribution Based on Onetime Differential Analysis

Figure 1:
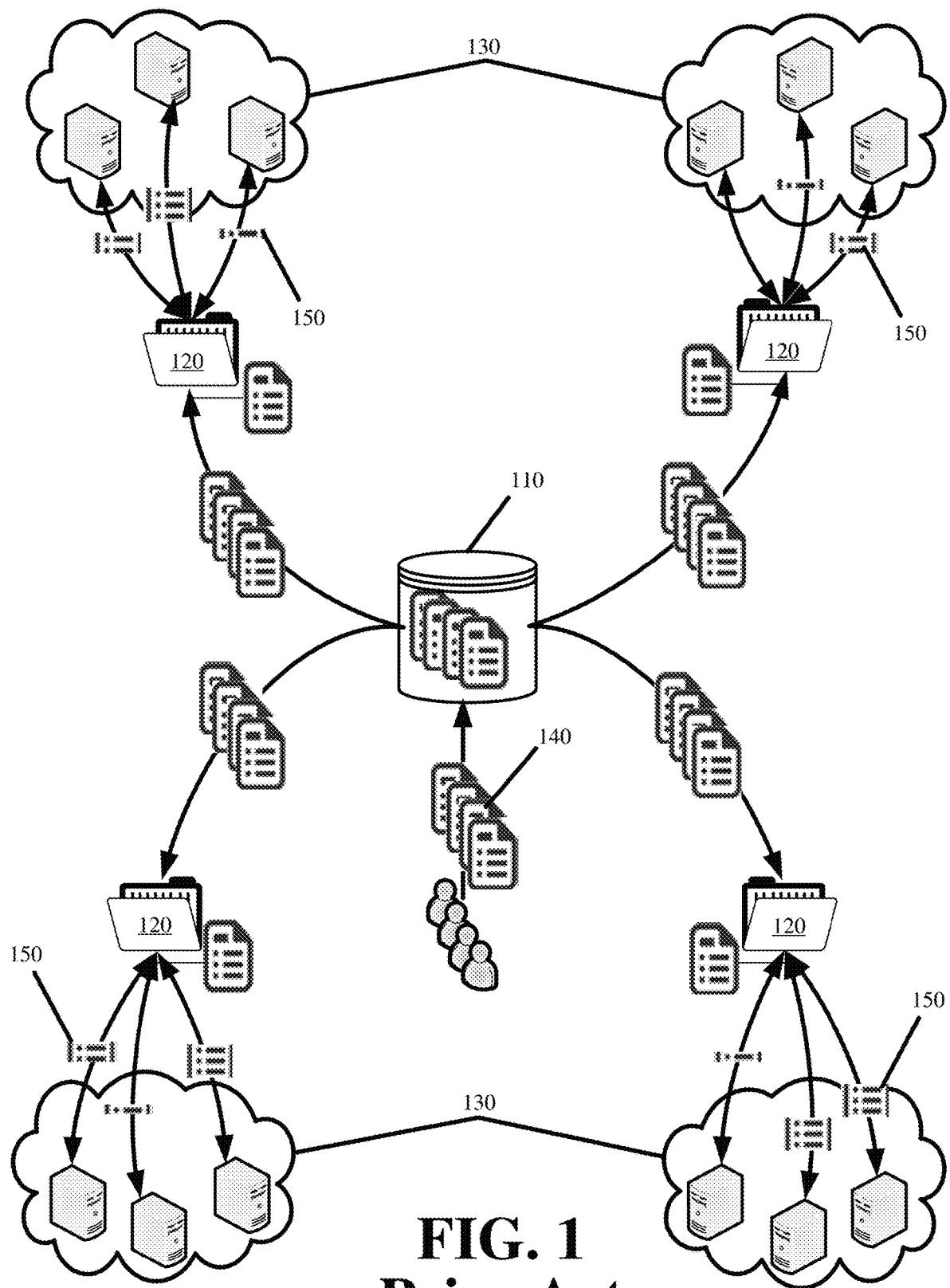
FIG. 1 illustrates a configuration distribution architecture for a distributed platform.

One way to reduce the propagation time of configurations to different servers operating as part of a distributed platform is to reduce the amount of data being transferred to the servers. This reduction can be obtained by propagating the segments from a configuration that have been updated (i.e., the updated segments) rather than the entirety of that configuration. However, as was noted with reference to FIG. 1, the identification of the updated segments can be computationally expensive when a repository mirror or other machine separately identifies the updated segments of a particular configuration for each server based on the previous instance of the particular configuration retained by each server. The delay associated with the computation can also offset any performance advantage of sending the updated segments instead of the entire configuration.

Figure 2:
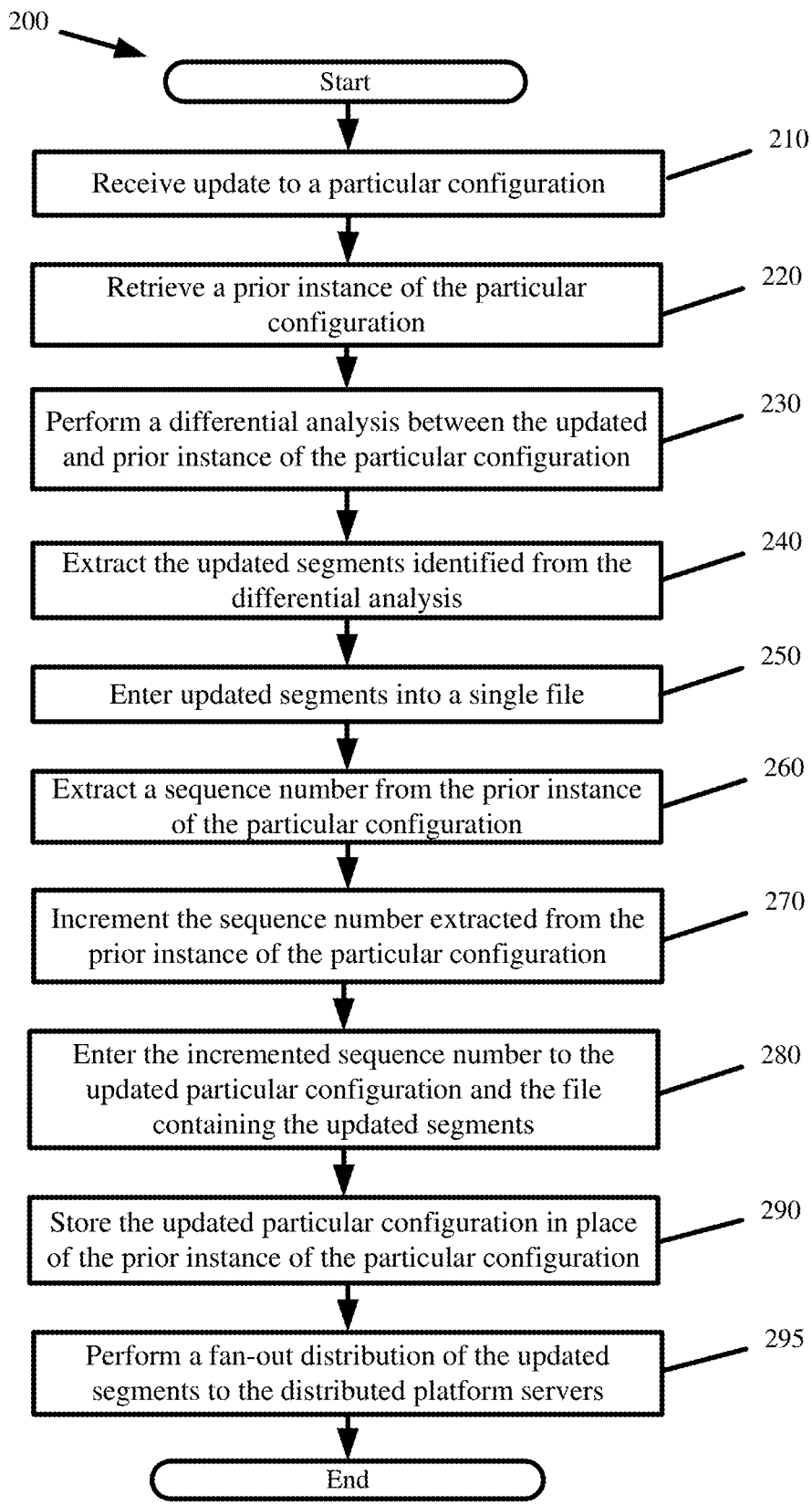
FIG. 2 presents a process for distributing update segments that are produced from a onetime differential analysis in accordance with some embodiments.

Some embodiments reduce the amount of data transferred without the overhead or delay introduced from performing the differential analysis for each server by instead propagating to the servers of the distributed platform, updated segments that are generated from a onetime differential analysis. FIG. 2 presents a process 200 for distributing update segments that are produced from a onetime differential analysis in accordance with some embodiments.

Process 200 can be performed by a master repository or any other server of the distributed platform acting as a centralized point of receiving configurations and configuration updates from distributed platform customers. The master repository can be one or more machines implementing a Subversion (SVN) system, such as Apache SVN, or a version control system, such as Git.

The process 200 commences as a result of receiving (at 210) an update to a particular configuration. The particular configuration may be defined by one of several customers of the distributed platform.

The process retrieves (at 220) a prior instance of the particular configuration from storage. The retrieval can be performed using a domain name, address, or other identifier associated with the particular configuration or the customer defining the particular configuration.

The process performs (at 230) a differential analysis between the updated instance and the prior instance of the particular configuration. Performing the differential analysis involves comparing the two versions of the particular configuration and identifying the segments that have been updated. This includes identifying segments that have been removed, added, or changed.

The process extracts (at 240) the updated segments identified from the differential analysis. The updated segments are entered (at 250) into a single file that is smaller in size than the file storing the updated particular configuration received at step 210. An identifier is included to identify the corresponding configuration to which the updated segments apply. The identifier can be a Uniform Resource Locator (URL) of the corresponding configuration in some embodiments. Other metadata or identifying information can be entered to define how each segment is used to update the prior instance of the particular configuration.

The process also extracts (at 260) a sequence number from the prior instance of the particular configuration. Each received instance of the particular configuration has or is assigned a sequentially incremented sequence number.

The process increments (at 270) the sequence number extracted from the prior instance of the particular configuration and enters (at 280) the incremented sequence number to the updated particular configuration and the file containing the updated segments.

The process stores (at 290) the updated particular configuration in place of the prior instance of the particular configuration. In doing so, the updated particular configuration becomes the prior instance of the particular configuration when a subsequent update to the particular configuration is received. The process then performs (at 295) a fan-out distribution of the updated segments, and more specifically, the file containing the updated segments to the distributed platform servers. For security purposes, the updated segments may be encrypted or signed with a private or shared encryption key before performing the fan-out distribution. This is to ensure that the servers only accept and apply updated segments from a specific source within the distributed platform.

Figure 3:
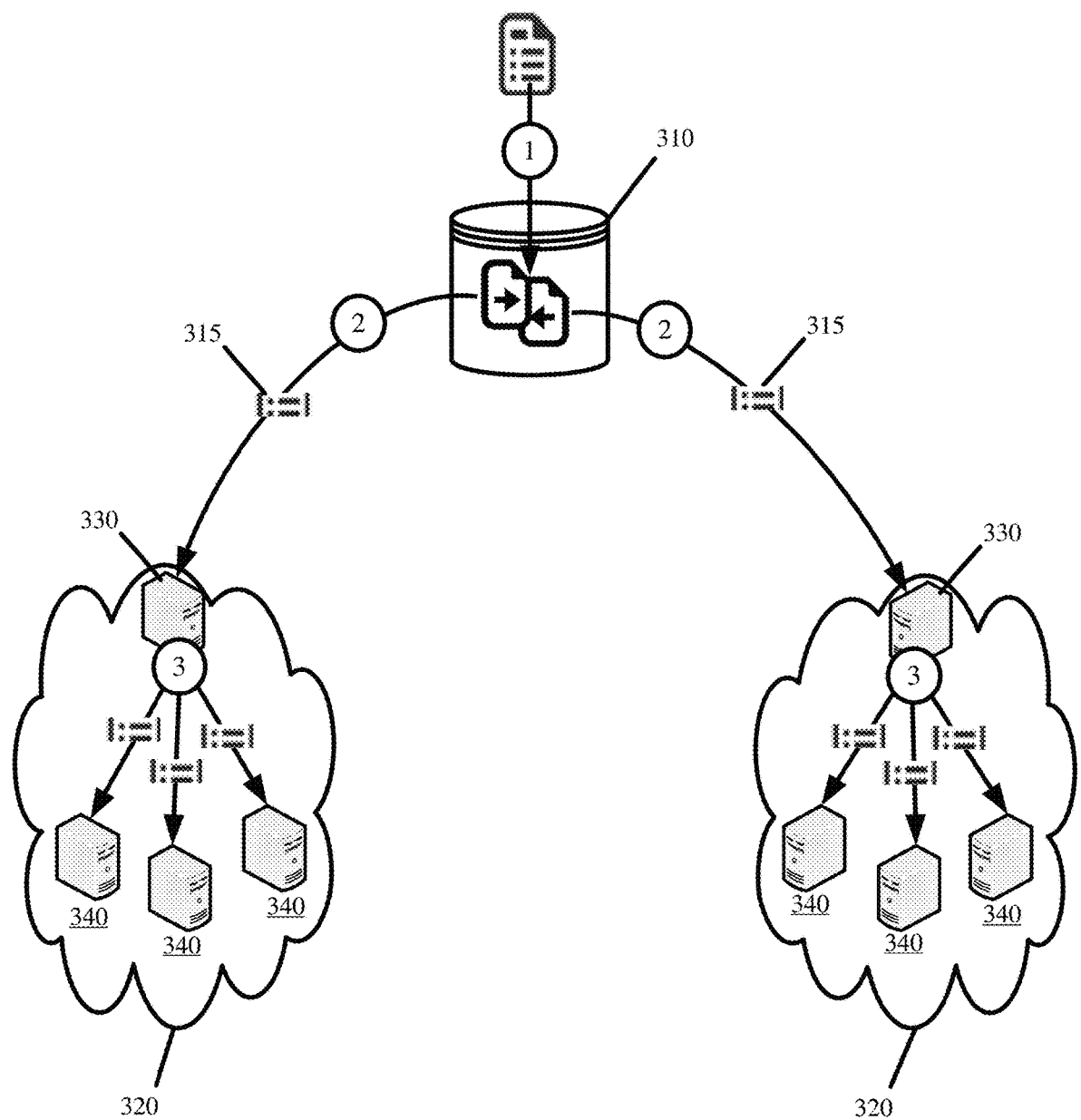
FIG. 3 conceptually illustrates the fan-out distribution of the updated segments from a master repository to the distributed platform servers in accordance with some embodiments.

FIG. 3 conceptually illustrates the fan-out distribution of the updated segments from a master repository 310 to the distributed platform servers in accordance with some embodiments. As shown, the servers are hierarchically arranged into different points-of-presence (PoPs) 320. Each PoP 320 represents a group or set of servers operating to service a different region or set of clients (e.g., clients in a particular address subnet or autonomous system, clients requesting a particular content or service, clients with specific devices, etc.). Other clustering of the servers to PoPs is also possible.

The fan-out commences with the master repository 310 initiating the distribution of the updated segments 315 to each of the PoPs 320 immediately or some short time after performing the onetime differential analysis. In particular, the master repository 310 sends the updated segments or the file containing the updated segments via HyperText Transfer Protocol (HTTP) messaging to a designated server 330 in each PoP 320. To do so, the master repository 310 is configured with the Internet Protocol (IP) addressing for the designated server 330 in each PoP 320. Alternatively, the master repository 310 may broadcast or send the updated segments to a particular multicast group with the designated server 330 from each PoP 320 listening or receiving the updated segments from the broadcast address or the particular multicast group.

The designated server 330 within a particular PoP 320 stores a local copy and immediately distributes the updated segments to the other servers 340 within the particular PoP 320. The other servers 340 receive and apply the updated segments to the corresponding configuration.

FIG. 3 illustrates a three-tier distribution. However, the same fan-out technique can be used when the distributed platform has more or less tiers. The tiers can also be modified to include load balancers, directors, repository mirrors, and other network connected machines of the distributed platform. Accordingly, the configuration distribution can be conducted using an existing configuration propagation architecture of a distributed platform, such as the architecture presented in FIG. 1. In so doing, a fast path for configuration propagation is created in addition to an existing slow path for configuration propagation through the same architecture.

The propagation distribution of FIG. 3 and related fast path propagation involves pushing the updated segments to the servers of the distributed platform as the updates are received or at designated times after the onetime differential analysis is performed. The slow path involves the staggered pulling of updated segments by different servers at different times in the manner described with reference to the prior art FIG. 1. The slow path may be retained for redundancy or failover purposes as described below.

The fast path significantly reduces overhead relative to the slow path. Computational overhead is significantly reduced because the fast path involves a onetime identification of one or more updated segments for a particular configuration before the updated segments are distributed to all servers, whereas the slow path involves separately computing and identifying one or more updated segments of the particular configuration for each server based on the last instance of the particular configuration retained by the server. Propagation delay and bandwidth overhead is also reduced as the fast path distributes the updated segments of the particular configuration according to the fan-out distribution of FIG. 3 or from a master repository to repository mirrors and from the repository mirrors to the servers. The slow path involves distributing a complete copy of the particular configuration from the master repository to the repository mirrors, each server requesting the update segments from a repository mirror, and the repository mirror responding with the requested update segments.

The distribution of the updated segments produced from the onetime differential analysis of some embodiments (i.e., the fast path) involves a verification operation at each server before the server can apply the updated segments. In particular, the server confirms that it has received and applied all previous updated segments for a particular configuration before applying a newly received updated segment to the particular configuration. The confirmation is conducted based on the sequence numbering entered with each updated segment that is propagated to the servers.

The verification operation and sequence number confirmation prevents a server from corrupting a particular configuration as a result of applying a newly received updated segment when at least one previous updated segment has not been applied to the particular configuration. As some examples, a server may miss receiving one or more updated segments in the push based embodiments disclosed above because of network connectivity issues, server failures, or the server restarting or otherwise being offline when the updated segments are propagated. In such cases, the server performs a failover operation to obtain the missing updated segments.

Figure 4:
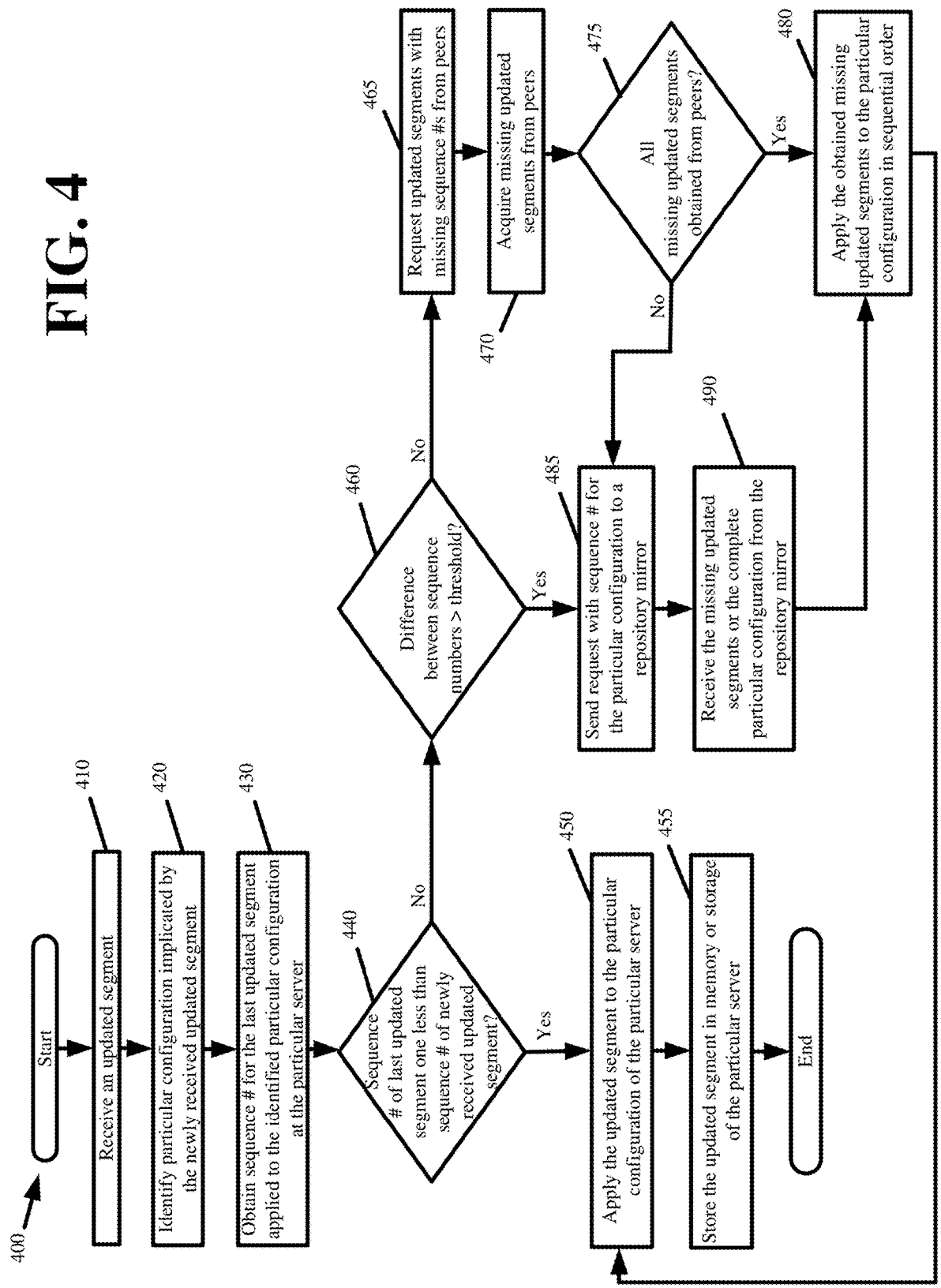
FIG. 4 presents an updated segment verification process in accordance with some embodiments.

FIG. 4 presents an updated segment verification process 400 in accordance with some embodiments. Process 400 commences on a particular server of the distributed platform in response to the particular server receiving (at 410) a file containing an updated segment for a particular configuration. The updated segment is pushed to the particular server using one of the fan-out distribution techniques described above or other means.

The process identifies (at 420) the particular configuration implicated by the newly received updated segment based on the identifier accompanying the updated segment. As noted above, a URL or other identifier of the particular configuration is passed as part of the file containing the updated segment.

The process obtains (at 430) the sequence number for the last updated segment applied to the identified particular configuration at the particular server. Stated differently, the particular server obtains the sequence number for the last updated segment applied to the identified particular configuration retained in the memory or storage of the particular server. The process compares (at 440) the sequence number for the last updated segment to the sequence number from the updated segment received at step 410.

In response to the last updated segment sequence number being one less than the newly received updated segment sequence number, the process applies (at 450) the updated segment to the particular configuration retained in memory or storage of the particular server. In some embodiments, applying the updated segments involves merging the updated segments into the particular configuration retained by the particular server, wherein the merging includes one or more of adding the updated segments to the particular configuration, removing the updated segments from the particular configuration, or substituting existing segments of the particular configuration retained by the particular server with the updated segments. After applying the updated segments to the particular configuration, the particular configuration is stored back to memory or storage of the particular server. The particular configuration reconfigures the control logic and operations of the particular server when a client request implicating the particular configuration is received by the particular server. In some embodiments, the request implicates the particular configuration when the request is for content or services of a customer who defines or otherwise administers the particular configuration. The process also separately stores (at 455) the updated segment with its corresponding sequence number in memory or storage. The distributed platform servers are configured to store some number of the most recently received updated segments for each retained configuration. In some embodiments, the servers are configured to store the last ten updated segments they receive for each configuration. The servers store the updated segments for failover and redundancy purposes further described below.

In response to the last updated segment sequence number differing from the newly received updated segment sequence number by more than a value of one, the process performs different failover operations depending on the sequence number variance. Should the sequence number variance not exceed (at 460) a defined threshold, the process performs a first failover operation to acquire the missing updated segments between the last updated segment applied to the particular configuration retained by the particular server and the newly received updated segment. Stated differently, the process performs the first failover operation to obtain the updated segments with the sequence numbers between the sequence number of the last updated segment applied to the particular configuration of the particular number and the sequence number of the updated segment received at step 410. Should the sequence number variance exceed (at 460) the defined threshold, the process performs a different second failover operation to acquire the missing updated segments.

In performing the first failover operation, the process requests (at 465) the updated segments with the missing intervening sequence numbers from one or more peers. In some embodiments, the requests are HTTP GET messages containing the identifier for the particular configuration at issue and one or more of the missing sequence numbers for the particular configuration. The process acquires (at 470) zero or more of the missing updated segments from the requested peers. The process may involve requesting the missing updated segments from a first peer, and if all of the missing updated segments cannot be obtained from the first peer, requesting the remaining missing updated segments from a second peer. In some embodiments, the first and second peers are servers within the same PoP as the particular server. In some other embodiments, the first peer is a server within the same PoP as the particular server and the second peer is a server in a nearby PoP. As noted with reference to step 455, each server is configured to store some prior number of updated segments. Accordingly, the missing updated segments can be quickly obtained with extremely low latency intra-PoP messaging as the messaging traverses one or a few network hops.

In some embodiments, the process is restricted to requesting the missing updated segments from a specified number of peers before failing over to the second failover operation. Accordingly, the process checks (at 475) to determine if all the missing updated segments have been obtained from the peers. If not, the process continues by performing the second failover operation. If all the missing updated segments have been obtained from the peers, the process applies (at 480) the obtained updated segments to the particular configuration in the correct sequential order before reverting to step 450 to apply (at 450) the updated segment received at 410 to the particular configuration and store (at 455) the updated segments with corresponding sequence numbers.

In performing the second failover operation, the process reverts to the slow path for configuration retrieval. The slow path involves sending (at 485) the sequence number for the particular configuration or a copy of the particular configuration retained by the particular server to a repository mirror. In response, the process receives (at 490) all the missing updated segments as identified by the repository mirror. The repository mirror will perform an independent differential analysis for the particular server in order to identify the missing updated segments for the particular server. The repository mirror could alternatively send a complete copy of the updated particular configuration. The process applies (at 480) the obtained updated segments to the particular configuration in the correct sequential order before reverting to step 450 to also apply (at 450) the updated segment received at 410 to the particular configuration.

Figure 5:
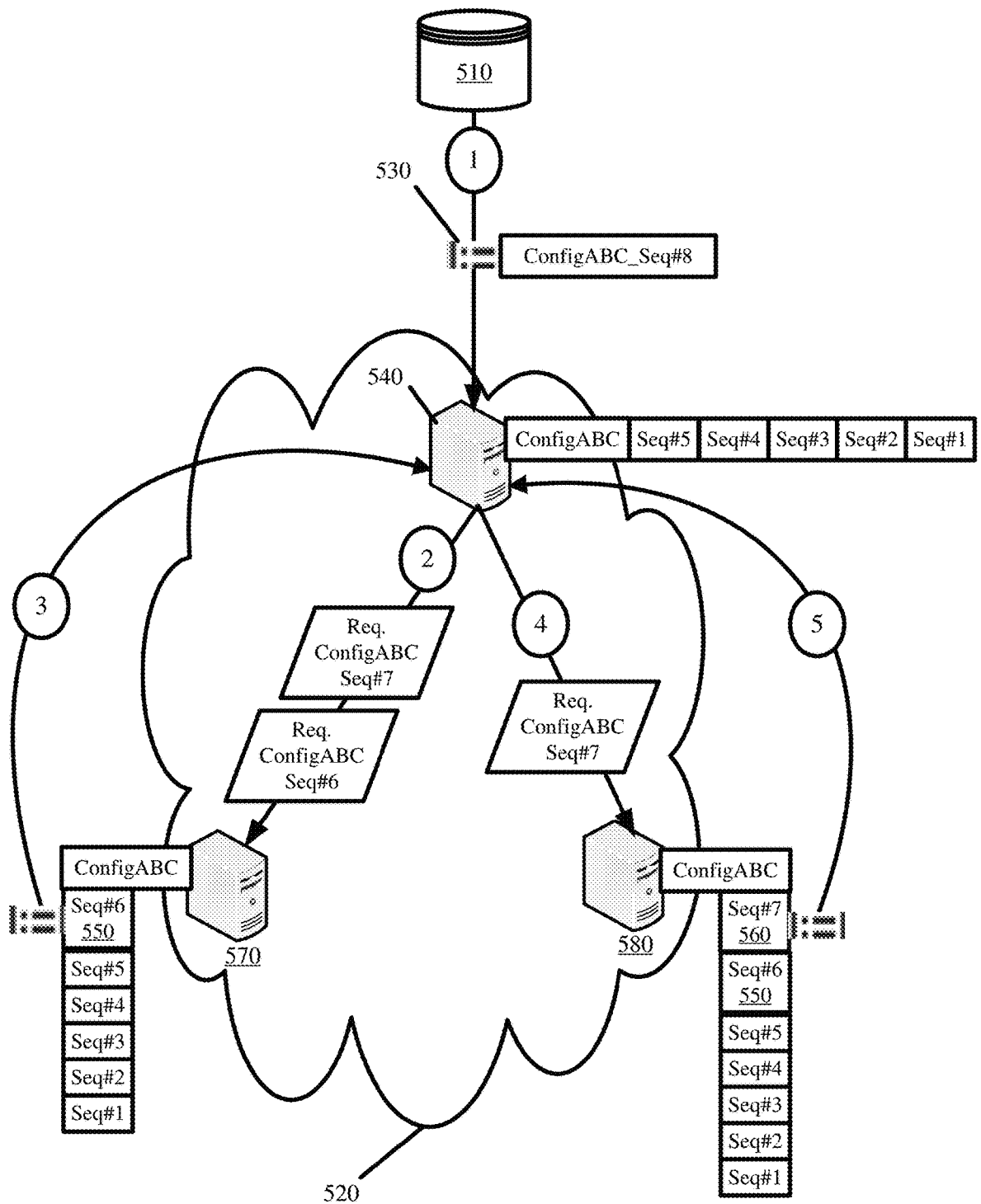
FIG. 5 conceptually illustrates the first failover operation in accordance with some embodiments.

FIG. 5 conceptually illustrates the first failover operation in accordance with some embodiments. The figure illustrates a master repository 510 and a single PoP 520 with multiple servers. The master repository 510 propagates an updated segment 530 with a sequence number to a first server 540 in the PoP 520. The updated segment 530 is for a particular customer configuration.

The first server 540 compares the sequence number of the updated segment 530 with the sequence number for the last updated segment applied to the particular customer configuration at the first server 540. The first server 540 determines that it has missed two prior updated segments 550 and 560 for the same particular customer configuration based on the sequence number of the updated segment 530 passed from the master repository 510.

The first server 540 requests the missing updated segments 550 and 560 from a second server 570 in the same PoP 520. The figure illustrates that the second server 570 stores only the first 550 of the two missing updated segments 550 and 560 in its memory. The second server 570 provides the first missing updated segment 550 to the first server 540 and also a message indicating that it does not have the second missing updated segment 560.

The first server 540 then requests the second missing updated segment 560 from a third server 580 in the same PoP 520. The third server 580 responds to the first server 540 with the second missing updated segment 560. The first server 540 then applies the updated segments 530, 550, and 560 according to the sequence number ordering.

III. Propagation of Compressed Configuration Images

Propagating the updated segments that are produced from a onetime differential analysis as described in the embodiments above is effective in quickly distributing small configuration changes or updates to the distributed platform servers. However, the distributed platform may also desire an efficient mechanism by which to distribute entire or complete configurations across the distributed platform servers. This is true when newly defined configurations are to be distributed to the platform servers, whether the new configurations are from new customers, from existing customers, or from the distributed platform wanting to upgrade or modify functionality of all servers. Moreover, propagation of the entire or complete configurations eliminates the overhead associated with the sequence or version numbering. The servers can simply reconfigure according to the newly received complete configurations rather than check whether intervening updated segments have been applied to a configuration. To this end, some embodiments perform the rapid configuration propagation based on a push based distribution of compressed images of the configurations.

Figure 6:
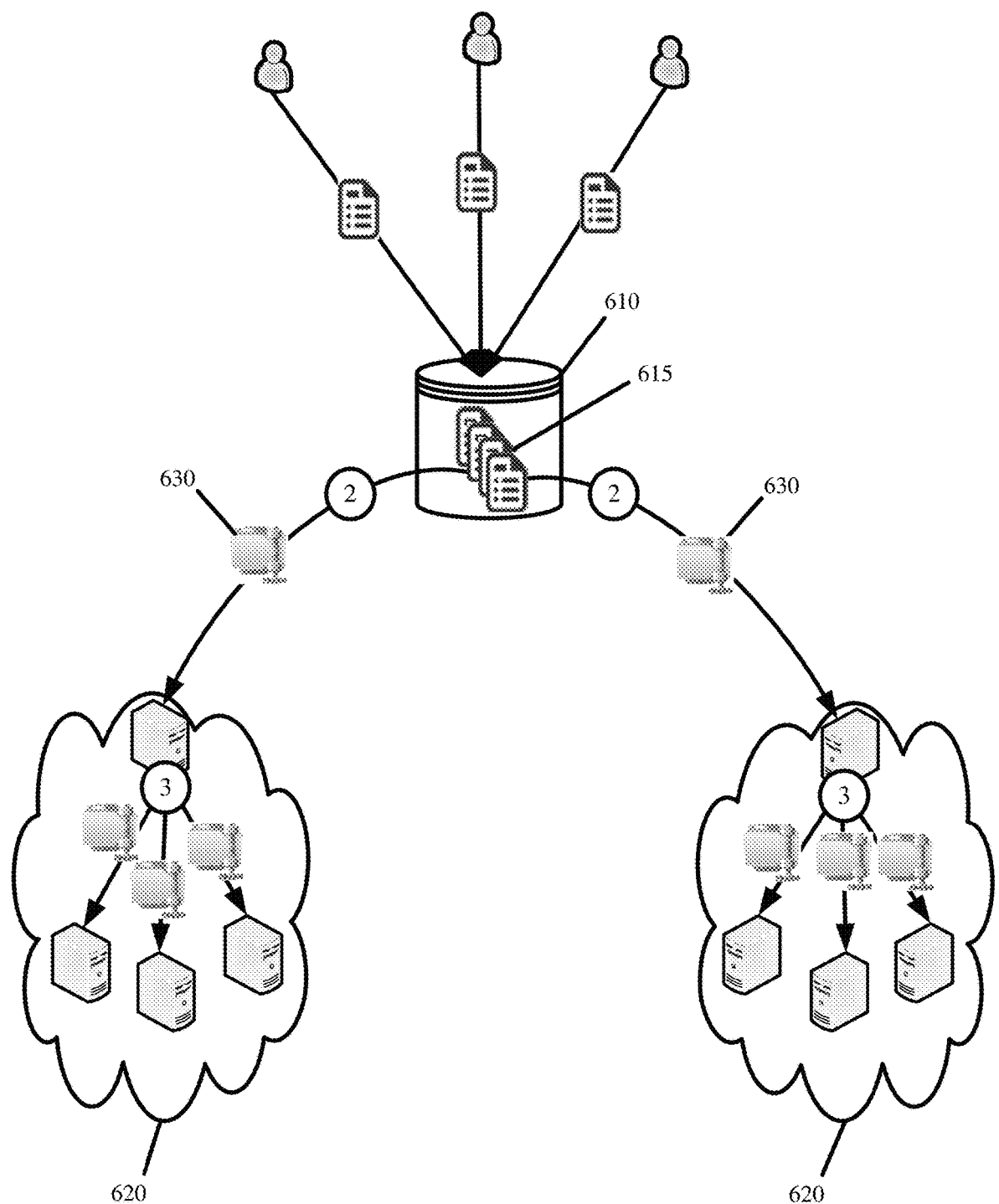
FIG. 6 conceptually illustrates the push based distribution of compressed configuration images in accordance with some embodiments.

FIG. 6 conceptually illustrates the push based distribution of compressed configuration images in accordance with some embodiments. The figure illustrates a master repository 610 and different PoPs 620 with different subsets of the distributed platform servers.

Once again, the master repository 610 is the source of all configurations 615 for the distributed platform. The master repository 610 receives all customer configurations 615 and any updates made thereto. The master repository 610 tracks the revisions and the most up-to-date set of configurations for the distributed platform. The master repository 610 can be implemented as a single machine or a collective set of machines.

Periodically or based on specific demand triggers, the master repository 610 compiles the complete set of the most up-to-date set of configurations 615. The master repository 610 compresses the configurations. The result is a compressed file system 630. In some embodiments, the master repository 610 produces a SquashFS compressed read-only file system with the complete set of configurations 615. The compressed file system 630 greatly reduces the size of the configurations 615, especially when the configurations are simple text files. For instance, thousands of uncompressed configurations totaling several gigabytes in size can be compressed into a SquashFS image that is under fifty megabytes in size. In other words, the file sizes for the configurations 615 can be reduced by a magnitude of about 30-60 when compiled and compressed into a compressed file system 630.

In some embodiments, the master repository 610 encrypts the compressed file system 630 with a shared key or a private key of the master repository 610 to prevent tampering during transmission. The encrypting can also involve adding a unique signature to the compressed file system 630. The signature identifies the compressed file system 610 as originating from the master repository 610 and not an unknown or untrusted third party. Instead of encrypting the compressed file system, some embodiments perform a hash and send the hash result along with compressed file system. The hash result can serve as a checksum to verify whether the contents of the compressed file system changed during transmission.

The master repository 610 then performs a fan-out distribution of the compressed file system 630 to the distributed platform servers, wherein the compressed file system 630 contains the complete set of configurations 615. The fan-out distribution can involve a tiered propagation that is similar to the one depicted in FIG. 3. This tiered propagation minimizes the bandwidth that is consumed in distributing the compressed file system 630 to the servers. In particular, the fan-out distribution transfers one copy of the compressed file system 630 over one established connection to each PoP 620. The compressed file system 630 is then redistributed within each PoP 620 over low latency links between the servers of the PoP 620. At the end of the propagation, each server of the distributed platform receives a copy of the compressed file system 630 containing the complete set of configurations 615. HTTP messaging can be used to encapsulate and send the compressed file system 630 to the distributed platform servers.

A pull based model could alternatively be used to distribute the compressed file system to the distributed platform servers. In some embodiments, the servers run a cron job to periodically pull the compressed file system from a repository within the distributed platform. This approach can use cache collapse forwarding to reduce the amount of bandwidth that is transferred to the PoPs as one server in a PoP retrieves the compressed file system and other servers in the PoP pull the compressed file system or missed updated configurations from the retrieving server.

Yet another alternative to the push based fan-out distribution is a parallelized distribution of the compressed file system. The parallelized distribution may be preferred because the compressed file system is large enough in size that it may occupy a sender for several seconds. Through a parallelized distribution, multiple senders work in collaboration to send different chunks or portions of the compressed file system to a recipient with the recipient piecing together the compressed file system from the different chunks provided by the different senders.

Accordingly, some embodiments provide a torrent based distribution of the compressed file system. The torrent based distribution involves the master repository propagating the compressed file system to two or more seed servers of the distributed platform, wherein the seed servers can be any of the distributed platform servers. The master repository can select different seed servers for the distribution of different instances of a compressed file system, wherein the selection can be randomized or based on criteria for efficient parallelized distribution.

The seed servers inform a tracker server that they have received the compressed file system and are available for redistribution of the compressed file system. The other distributed platform servers initially act as clients that are configured to periodically query the tracker server for an updated or new compressed file system as well as the seed servers where the updated or new compressed file system can be downloaded from. The clients then request and download different portions of the updated or new compressed file system from two or more seed servers.

Once a client downloads one or more chunks or the entirety of the updated or new compressed file system, the client can switch to becoming a seed server. To do so, the client informs the tracker server that it has various chunks or the entirety of the updated or new compressed file system and it is available to redistribute them. Over time, the number of seeds grows, allowing for greater parallelization and faster propagation of the compressed file system. Moreover, the clients can optimize the compressed file system download by targeting requests for different chunks to the seed servers that are nearest to the clients.

Some embodiments use a trackerless torrent implementation to eliminate the risk of the tracker server(s) going down. In some such embodiments, a cron job run by each server causes the server to periodically pull the torrent file similar to the pull model above to determine when a new compressed file system is available.

The fan-out distribution of FIG. 6, pull based distribution, and parallelized distribution described above provide efficient means of distributing the complete set of configurations to the servers. The servers however also require an efficient means with which to access the configurations as they are needed.

The servers could decompress the file system and extract the decompressed configurations into memory (i.e., main memory or random access memory). It is likely however that the servers would run out of memory if all the decompressed configurations (when several gigabytes in size) were preloaded into memory for immediate access. Even if the servers do not run out of memory, they would lose memory that could otherwise be devoted to caching requested content or services, thereby degrading the server performance as a result of a higher cache miss ratio when responding to client requests. Loading all configuration is also wasteful as a particular server would likely access a small subset of the configurations based on the particular server receiving requests directed to a specific subset of customers and their corresponding content or services.

Decompressing the compressed file system and extracting all the decompressed configurations to disk or storage would similarly degrade server performance. First, the servers could spend several minutes simply writing the decompressed configurations to storage during which time the server would be slow to perform its primary tasks in responding to client requests, especially if those requests required storage access. Second, even if the configurations were decompressed to storage, the server would subsequently have to perform a slow disk or storage access to read a particular configuration that is implicated by a client request into memory.

Figure 7:
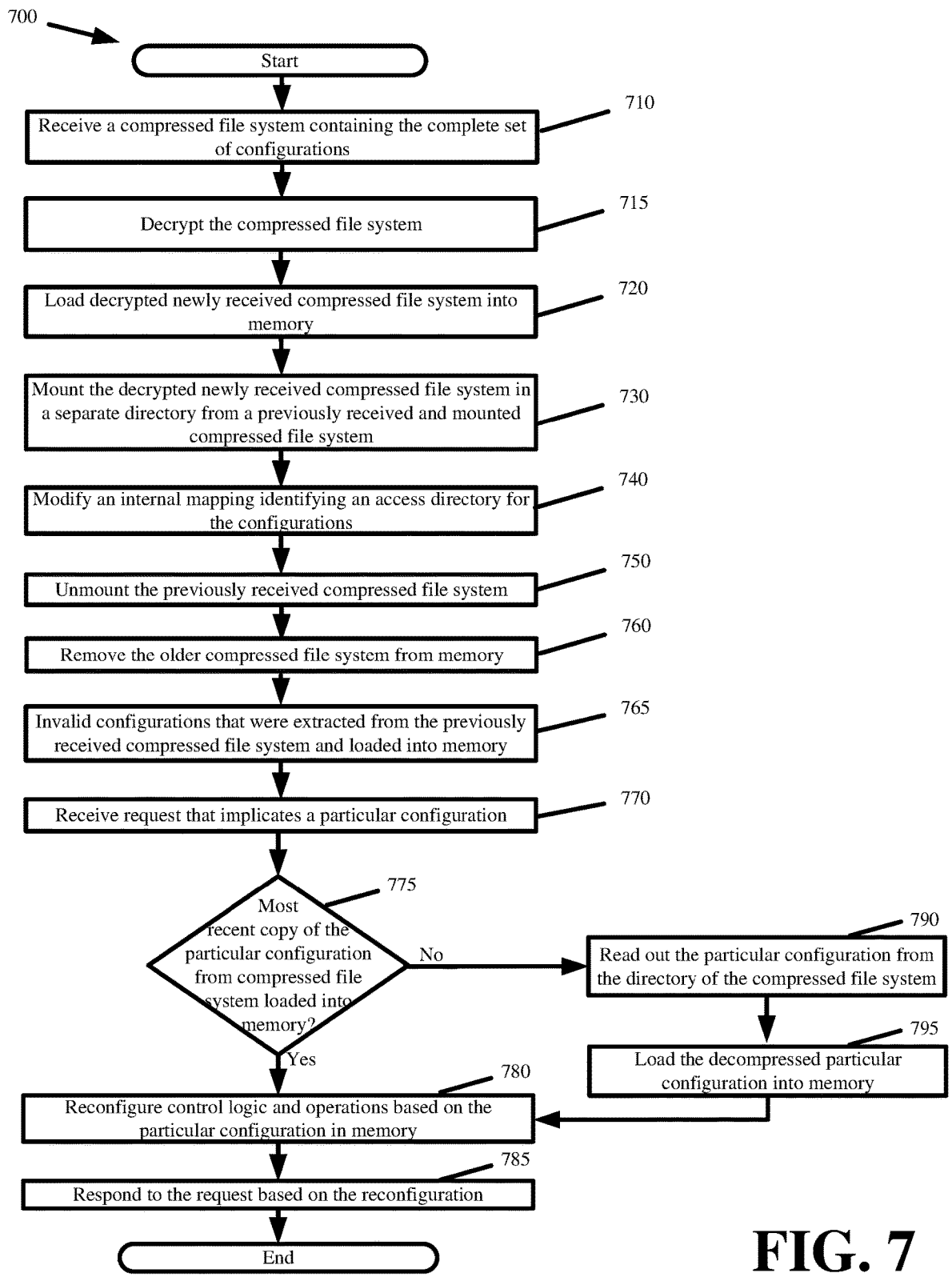
FIG. 7 presents a process for the memory based on-demand accessing of configurations directly from a compressed file system in accordance with some embodiments.

Accordingly, some embodiments implement a memory based on-demand accessing of configurations directly from the compressed file system. FIG. 7 presents a process 700 for the memory based on-demand accessing of configurations directly from a compressed file system in accordance with some embodiments. The process 700 is performed by a distributed platform server.

The process commences with the distributed platform server receiving (at 710) a compressed file system containing the complete set of configurations. The server receives the compressed file system according to one of the above described propagation methodologies.

In response to the newly received compressed file system being encrypted for secure delivery, the process decrypts (at 715) the compressed file system. The decryption can be performed using a public key corresponding to the private key of the master repository (i.e., asymmetric encryption). Successful decryption with the public key of the master repository confirms that the compressed file system originated from the master repository and was not tampered during transmission. Alternatively, the encryption and decryption can be performed using a shared key (i.e., symmetric encryption).

The process loads (at 720) the decrypted newly received compressed file system into memory. The high level of compression allows the compressed file system to be loaded into main memory without impacting server performance. For instance, a fifty megabyte compressed file system can store several gigabytes worth of uncompressed configurations. In some embodiments, the loading step happens implicitly when the file system is read, after or possibly during mounting.

The process mounts (at 730) the decrypted newly received compressed file system. The decrypted newly received compressed file system is mounted in a separate directory from a previously received and mounted compressed file system, wherein the newly received compressed file system contains one or more new configurations or configuration updates that are not present in the previously received and mounted compressed file system.

The process modifies (at 740) an internal mapping identifying an access directory for the configurations. In some embodiments, modifying the internal mapping involves changing a pointer, symbolic link (i.e., symlink), or other reference from the directory of the previously received compressed file system to the directory of the decrypted newly received and mounted compressed file system. Modifying the internal mapping causes the server to retrieve configurations that are not already in memory from the directory of the newly received compressed file system pointed to by the pointer or other reference. For example, the server may define a target path from which to access configurations. The target path has a symlink that initially directs to the directory of the previously received compressed file system. In modifying the internal mapping at step 740, the process changes this symlink such that any subsequent access to the target path directs to the directory of the newly received compressed file system.

The process unmounts (at 750) the previously received compressed file system and removes (at 760) the older compressed file system from memory. The process optionally invalidates (at 765) the configurations that were extracted from the previously received compressed file system and loaded into memory, wherein the invalidation can involve removing the configurations from memory or marking a flag to indicate that the configurations in memory are no longer valid.

The process continues in response to receiving (at 770) a request that implicates a particular configuration. The request implicates a particular configuration when the request URL points to content or services of a particular customer who has defined the particular configuration to customize the manner with which the server provides the requested content or services to the requestor.

The process validates (at 775) whether the most recent copy of the particular configuration from the newly received compressed file system is loaded into memory. In some embodiments, the validation first involves inspecting the memory to determine if the particular configuration is in memory. Validation fails if the particular configuration is not loaded into memory. Validation also fails if an old or obsolete copy of the particular configuration is loaded into memory. Some embodiments detect an old or obsolete copy when the particular configuration loaded into memory is associated with an invalidation flag. Some embodiments detect an old or obsolete copy when the particular configuration loaded into memory has a sequence or version number that does not match to the sequence or version number of the particular configuration in the compressed file system. In some such embodiments, the process inspects the memory and detects a copy of the particular configuration loaded thereto. The process reads the sequence or version number of the particular configuration in memory. The process accesses the directory of the compressed file system to then read the sequence or version number for the particular configuration in the compressed file system. The SquashFS file system allows the reading of files within the compressed file system to be performed in the same manner with similar performance as reading files from an uncompressed file system. Validation of the particular configuration in memory fails when the sequence or version numbers are mismatched.

Validation is successful when the sequence or version numbers match. Some embodiments detect an old or obsolete copy based on a hash of the configuration file or parameters.

In response to a successful validation, the process reconfigures (at 780) its control logic and operations according to the particular configuration that is loaded into memory. The process then responds (at 785) to the request based on the parameters, control logic, or operations of the particular configuration.

In response to a failed validation, the process accesses (at 790) the directory of the mounted compressed file system to read out the particular configuration. Reading out the particular configuration involves performing an on-the-fly decompression of the particular configuration from the compressed file system. The process loads (at 795) the decompressed particular configuration into memory. The process then reverts to step 780 and reconfigures its control logic and operations according to the particular configuration before responding (at 785) to the request.

Some embodiments avoid the validation step and simply read out a configuration from the directory of the compressed file system for every request that implicates that configuration Eliminating the validation step can improve performance in cases where loaded configurations are implicated once or a few times prior to clearing the configurations from memory or receiving updates to the configurations. The validation step may be retained when configurations are accessed multiple times after being read out from the compressed file system directory and loaded into memory.

Some embodiments implement the push based distribution of compressed configuration images in conjunction with the propagation of updated segments that are produced from a onetime differential analysis. Such a hybrid implementation is preferred when it is desirable to reset all servers with the complete set of configurations with a first frequency and to provide the updated segments with a second frequency that is more frequent than the first frequency. For instance, the distributed platform may propagate the compressed file system to all servers once a day, and then provide the updated segments throughout the day for any configurations that are updated before the next daily distribution of the compressed file system.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
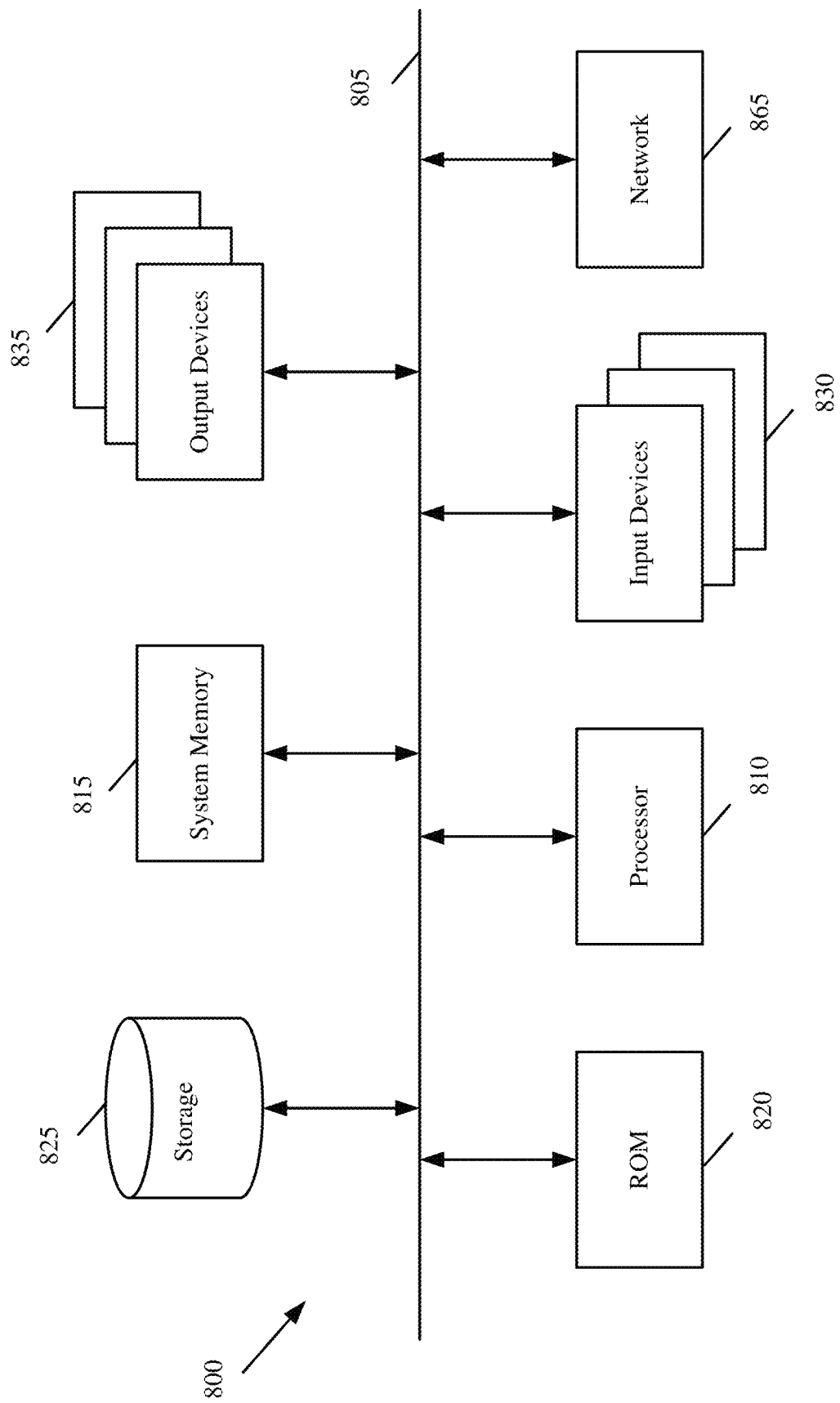
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., master repository, repository mirror, server, etc.). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
receiving an update to a particular file at a first server operating from a first location of a distributed platform;
determining at least one segment of the particular file that is changed in said update based on a differential analysis between the update to the particular file and a previous stored instance of the particular file;

distributing the at least one segment, corresponding to an updated section of the particular file, with a first sequence number from the first server at the first location to a second server at a remote second location of the distributed platform, wherein said distributing comprises pushing less than a complete copy of the particular file from the first server to the second server without the second server requesting the update or the first server tracking status of the particular file at the second server;

incrementally modifying a stored copy of the particular file at the second server by merging the at least one segment into the stored copy of the particular file in response to the first sequence number of the at least one segment differing from a second sequence number of the stored copy of the particular file by a first value; and performing, at the second server, one of a plurality of failover operations with different locations in the distributed platform based on the first sequence number differing from the second sequence number by a second value that is greater than the first value, wherein performing one of the plurality of failover operations comprises:

performing a first failover operation with the second server retrieving a first set of segments with sequence numbers in between the first sequence number and the second sequence number from a peer server, that operates in the common second location as the second server, in response to the second value being less than a threshold; and performing a different second failover operation with the second server retrieving a second set of segments with sequence numbers in between the first sequence number and the second sequence number from a configuration repository, that includes the first server and that is at the first location that is remote from the second location of the distributed platform, in response to the second value being greater than the threshold, wherein the second set of segments comprises at least one more segment than the first set of segments.

2. The method of claim 1, wherein said merging comprises adding the at least one segment to the stored copy of the particular file at the second server, removing the at least one segment from the stored copy of the particular file at the second server, or replacing the at least one segment within the stored copy of the particular file at said second server.

3. The method of claim 1 further comprising receiving at the second server, a request implicating said particular file.

4. The method of claim 3 further comprising reconfiguring the second server according to the stored copy of the particular file that is incrementally modified with the at least one segment.

5. The method of claim 1, wherein said distributing comprises pushing the at least one segment from the first server to a second tier of servers of the distributed platform prior to any server of the second tier of servers requesting the update or the at least one segment, and pushing the at least one segment from the second tier of servers to a third tier of servers of the distributed platform, wherein the third tier of servers comprises the second server.

6. The method of claim 1 further comprising distributing a plurality of files as a compressed file system from the first server to the third server of the distributed platform, wherein the plurality of files comprises the particular file with said update.

7. A method comprising:

mounting a first compressed file system with a compressed first plurality of files by loading the first compressed file system from storage or disk of a device to memory of the device, and by creating a first directory from which to access any of the compressed first plurality of files from said memory, wherein said memory is faster and smaller in capacity than the storage or disk;

changing an internal mapping of an active file access directory, from which the device obtains files, to the first directory;

receiving a first request implicating a particular file from the compressed first plurality of files;

extracting a first instance of the particular file from the first directory of the compressed first file system to said memory based on the internal mapping of the active file access directory to the first directory and in response to the first request implicating the particular file;

receiving a second compressed file system with a compressed second plurality of files that differ from the compressed first plurality of files by at least one file;

mounting the second compressed file system by loading the second compressed file system to said memory, and by creating a second directory from which to access any of the compressed second plurality of files;

changing the internal mapping of the active file access directory from the first directory to the second directory;

receiving a second request implicating the particular file;

replacing a first instance of the particular file, that is extracted from the compressed file system, with a second instance of the particular file based on changing the internal mapping of the active file access directory from the first directory to the second directory and the second instance of the particular file in the second compressed file system differing from the first instance of the particular file.

8. The method of claim 7 further comprising reconfiguring the device based on the first instance of the particular file in response to said extracting and the first request implicating the particular file.

9. The method of claim 7 further comprising removing the first compressed file system from said memory by unmounting the first compressed file system.

10. The method of claim 7 further comprising receiving an update to the particular file.

11. The method of claim 10 further comprising determining at least one segment of the particular file that is changed in said update.

12. The method of claim 11 further comprising distributing the at least one segment with a first sequence number to the device.

13. The method of claim 12 further comprising applying the at least one segment to the second instance of the particular file in response to the first sequence number of the at least one segment differing from a second sequence number of the second instance of the particular file by a value of one.

14. A method comprising:

distributing, at a first time, a plurality of files as a compressed file system from a first server to a second server;

responding to a first request at the second server using a particular file of the plurality of files extracted from said compressed file system;

receiving an update to the particular file at the first server at a second time that comes after the first time;

determining at the first server, at least one segment of the particular file that is changed in said update;

distributing, at the second time, the at least one segment with a first sequence number from the first server to the second server, wherein said distributing comprises pushing less than a complete copy of the particular file from the first server to the second server without the second server requesting the update or the first server tracking status of the particular file at the second server;

retrieving by the second server, at least one intervening segment with a third sequence number in between the first sequence number and the second sequence number in response to the first sequence number differing from a second sequence number of the particular file in said compressed file system by a value greater than one and prior to the first server distributing the at least one intervening segment to the second server; and responding to a second request at the second server using the particular file modified with the at least one segment.

15. The method of claim 14 further comprising applying the at least one segment to the particular file at the second server in response to the first sequence number of the at least one segment differing from the second sequence number of the particular file in said compressed file system by a value of one.

16. The method of claim 14 further comprising accessing the particular file from the compressed file system in responding to said first request, wherein said accessing comprises loading the compressed file system to memory of the second server, and creating a directory from which to read the plurality of files of the compressed file system from said memory.

\* \* \* \* \*